US008635499B2

(12) United States Patent
Cohn et al.

(10) Patent No.: US 8,635,499 B2
(45) Date of Patent: Jan. 21, 2014

(54) SERVER-BASED NOTIFICATION OF ALARM EVENT SUBSEQUENT TO COMMUNICATION FAILURE WITH ARMED SECURITY SYSTEM

(75) Inventors: Alan Wade Cohn, Austin, TX (US); Gary Robert Faulkner, Austin, TX (US); James Edward Kitchen, Austin, TX (US); David Leon Proft, Austin, TX (US); Corey Wayne Quain, Lago Vista, TX (US)

(73) Assignee: iControl Networks, Inc., Redwood City, CA (US)

( * ) Notice: Subject to any disclaimer, the term of this patent is extended or adjusted under 35 U.S.C. 154(b) by 134 days.

(21) Appl. No.: 12/770,253

(22) Filed: Apr. 29, 2010

(65) Prior Publication Data

US 2010/0281312 A1 Nov. 4, 2010

Related U.S. Application Data

(60) Provisional application No. 61/174,366, filed on Apr. 30, 2009.

(51) Int. Cl.
 *G06F 11/00* (2006.01)
(52) U.S. Cl.
 USPC .............................. 714/43; 714/49; 340/501
(58) Field of Classification Search
 USPC ............................... 714/43, 49; 340/506, 501
 See application file for complete search history.

(56) References Cited

U.S. PATENT DOCUMENTS

| 4,574,305 A * | 3/1986 | Campbell et al. ............. 725/119 |
| 4,694,282 A * | 9/1987 | Tamura et al. ............. 340/539.1 |
| 4,730,184 A * | 3/1988 | Bach ........................... 340/691.5 |
| 5,471,194 A * | 11/1995 | Guscott ......................... 340/511 |
| 6,078,253 A * | 6/2000 | Fowler .......................... 340/501 |
| 6,078,257 A * | 6/2000 | Ferraro ....................... 340/568.1 |
| 6,320,506 B1 * | 11/2001 | Ferraro ....................... 340/568.1 |
| 7,075,429 B2 * | 7/2006 | Marshall ........................ 340/540 |
| 2002/0163997 A1 * | 11/2002 | Bergman et al. ................ 379/37 |
| 2002/0177428 A1 * | 11/2002 | Menard et al. .................. 455/404 |
| 2003/0062997 A1 | 4/2003 | Naidoo et al. ................. 340/531 |
| 2004/0117462 A1 | 6/2004 | Bodin et al. ................... 709/220 |

(Continued)

FOREIGN PATENT DOCUMENTS

| FR | 2 584 217 | 1/1987 |
| WO | WO 99/34339 | 7/1999 |

(Continued)

OTHER PUBLICATIONS

"Control Panel Standard—Features for False Alarm Reduction," The Security Industry Association, © SIA 2009, pp. 1-48.

*Primary Examiner* — Loan L. T. Truong
(74) *Attorney, Agent, or Firm* — Gregory & Sawrie LLP

(57) ABSTRACT

A server-based environment for reporting a status of a security, monitoring and automation controller is provided. Detecting cessation of an always-on persistent network connection between the SMA controller and the server is also provided. Reporting the cessation of the network connection to an end user and defined others is further provided. A further aspect provides for automatically reporting an alarm event to a central station, the end user, and others, in the event the cessation of the network connection occurs while the SMA controller is armed and after a zone fault event, and not receiving a disarm notification prior to expiration of a preset entry delay.

20 Claims, 10 Drawing Sheets

(56) References Cited

U.S. PATENT DOCUMENTS

| | | | |
|---|---|---|---|
| 2004/0117465 A1 | 6/2004 | Bodin et al. | 709/222 |
| 2005/0216580 A1 | 9/2005 | Raji et al. | 709/223 |
| 2005/0237182 A1* | 10/2005 | Wang | 340/539.1 |
| 2005/0276389 A1 | 12/2005 | Hinkson et al. | 379/37 |
| 2006/0051122 A1 | 3/2006 | Kawazu et al. | 399/88 |
| 2006/0067484 A1* | 3/2006 | Elliot et al. | 379/37 |
| 2006/0078344 A1 | 4/2006 | Kawazu et al. | 399/69 |
| 2006/0167784 A1* | 7/2006 | Hoffberg | 705/37 |
| 2008/0117029 A1* | 5/2008 | Dohrmann et al. | 340/286.02 |
| 2008/0170511 A1* | 7/2008 | Shorty et al. | 370/254 |
| 2009/0066789 A1 | 3/2009 | Baum et al. | 348/143 |
| 2009/0070436 A1 | 3/2009 | Dawes et al. | 709/219 |
| 2009/0070477 A1 | 3/2009 | Baum et al. | 709/231 |
| 2009/0070681 A1 | 3/2009 | Dawes et al. | 715/736 |
| 2009/0070682 A1 | 3/2009 | Dawes et al. | 715/736 |
| 2009/0070692 A1 | 3/2009 | Dawes et al. | 715/764 |
| 2009/0074184 A1 | 3/2009 | Baum et al. | 380/205 |
| 2009/0077167 A1 | 3/2009 | Baum et al. | 709/203 |
| 2009/0077622 A1 | 3/2009 | Baum et al. | 726/1 |
| 2009/0077623 A1 | 3/2009 | Baum et al. | 726/1 |
| 2009/0077624 A1 | 3/2009 | Baum et al. | 726/1 |
| 2009/0134998 A1 | 5/2009 | Baum et al. | 340/539.1 |
| 2009/0138600 A1* | 5/2009 | Baum et al. | 709/226 |
| 2009/0138958 A1 | 5/2009 | Baum et al. | 726/12 |
| 2009/0165114 A1 | 6/2009 | Baum et al. | 726/12 |
| 2010/0026487 A1* | 2/2010 | Hershkovitz | 340/541 |
| 2010/0267390 A1* | 10/2010 | Lin et al. | 455/445 |
| 2011/0096678 A1* | 4/2011 | Ketonen | 370/252 |
| 2012/0154138 A1* | 6/2012 | Cohn et al. | 340/501 |

FOREIGN PATENT DOCUMENTS

| | | |
|---|---|---|
| WO | WO 2004/098127 | 11/2004 |
| WO | WO 2005/091218 | 9/2005 |
| WO | WO 2009/006670 | 1/2009 |

* cited by examiner

SERVER-BASED NOTIFICATION OF ALARM EVENT SUBSEQUENT TO COMMUNICATION FAILURE WITH ARMED SECURITY SYSTEM

CROSS REFERENCE TO RELATED APPLICATIONS

This invention claims priority from Provisional Patent Application Ser. No. 61/174,366, entitled "REMOTE SECURITY STATION," filed Apr. 30, 2009, and naming Alan Wade Cohn as inventor. This provisional patent application is incorporated herein by reference in its entirety and for all purposes.

FIELD OF THE INVENTION

Embodiments of the present invention relate generally to the field of home security, monitoring and automation, and specifically to remotely providing zone fault event notification to one or more of a user of a home security, monitoring and automation device and a security central station in the event of a loss of communication with the home security, monitoring and automation device.

BACKGROUND OF THE INVENTION

Residential electronics and control standards provide an opportunity for a variety of options for securing, monitoring, and automating residences. Wireless protocols for transmission of security information permit placement of a multitude of security sensors throughout a residence without a need for running wires back to a central control panel. Inexpensive wireless cameras also allow for placement of cameras throughout a residence to enable easy monitoring of the residence. A variety of home automation control protocols have also been developed to allow for centralized remote control of lights, appliances, and environmental apparatuses (e.g., thermostats). Traditionally, each of these security, monitoring and automation protocols require separate programming, control and monitoring stations. To the extent that home automation and monitoring systems have been coupled to home security systems, such coupling has involved including the automation and monitoring systems as slaves to the existing home security system. This limits the flexibility and versatility of the automation and monitoring systems and ties such systems to proprietary architectures.

A security system alerts occupants of a dwelling and emergency authorities of a violation of premises secured by the system. A home monitoring system monitors a status of a home so that a user can be made aware of any monitored state changes. A home automation system automates and remotely controls lifestyle conveniences such as lighting, heating, cooling, and appliances.

Rather than having multiple devices to control each of the security, monitoring and automation environments, it is desirable to have a centralized controller capable of operating in each environment, thereby reducing the equipment needed in a dwelling. It is further desirable for such a controller to function as a gateway for external network access. Gateway access can include user access to the controller in order to control or monitor devices in locations remote from the dwelling.

A single controller controlling security, monitoring and automation can become a point source for failure, either accidentally or by design (e.g., an intruder disabling the device). It is therefore desirable to have a mechanism for reporting a loss of communication with the controller to an end user or selected others. It is further desirable to have a mechanism to report a zone fault event to a central station and an end user in the event communication with the controller is lost subsequent to the zone fault event and one or more delay timers have expired.

SUMMARY OF THE INVENTION

Embodiments of the present invention provide a server-based environment for reporting a status of a security, monitoring and automation (SMA) controller. Embodiments of the present invention provide for detecting cessation of an always-on persistent network connection between the SMA controller and a remote server. An aspect of these embodiments further provides for reporting the cessation of the network connection to an end user and defined others. A further aspect provides for automatically reporting an alarm message to a central station, the end user, and others, in the event cessation of the network connection occurs while the SMA controller is armed and after a zone fault event, thereby preventing a disarm indication or other alarm clearing message from arriving at the server before expiration of a preset delay window (e.g., an entry delay).

One embodiment of the present invention provides for receiving state information of a remote network node, such as an SMA controller, by a server over a first network connection, the server determining that a loss of communication has occurred between the remote network node and the server, and the server subsequently transmitting a message, defined by the state information, to a second remote device over a second network connection. In an aspect of this embodiment, the server receives one or more of a sensor event notification message and an entry delay timer initiation notification message from the SMA controller before the loss of communication. If the state information indicates that the SMA controller is armed, then a delay window timer is started upon receipt of the entry delay timer initiation notification message or the sensor event notification message (if no entry delay timer initiation message is sent) and, if the delay window timer expires prior to receiving subsequent state information from the SMA controller indicating a disarmed status, the server defines the content of the message as an alarm message.

Aspects of the above embodiments further provide for the delay window timer to correspond to a customer service tier associated with an end user of the remote network node, or a value purchased by the end user. Other aspects of the above embodiments provide for the second remote device to be a portal server, a mobile network device or a remote user's computer.

Another aspect of the above embodiments provides for the content of the message to be an information message, if the SMA controller was unarmed, wherein the information comprises one or more of the received state information and the status of the first network connection.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a server-based environment for reporting a status of a security, monitoring and automation (SMA) controller. Embodiments of the present invention provide for detecting cessation of an always-on persistent network connection between the SMA controller and a remote server. An aspect of these embodiments further provides for reporting the cessation of the network connection to an end user and defined others. A further aspect provides for automatically reporting an alarm event to a central station, the end user, or others, in the event the cessation of the network connection occurs while the SMA controller is armed and after a sensor zone fault event, and not receiving a disarm notification prior to expiration of a preset entry delay.

Architectural Overview

Embodiments of the configurable security, monitoring and automation (SMA) controller of the present invention provide not only for communicating with and interpreting signals from sensors and devices within a dwelling, but also for accessing and monitoring those sensors and devices from locations remote to the dwelling. Embodiments of the SMA controller provide such capability through linkages to external servers via access networks such as the Internet, provider network, or a cellular network. The external servers provide a portal environment through which a user can, for example, monitor the state of sensors coupled to the SMA controller in real-time, configure the controller, and provide controlling information to the SMA controller. The external servers can also monitor the state of the SMA controller and the network connections between the SMA controller and the servers. The servers further provide a connection to a traditional security central station, which can then contact authorities in the event of an alarm condition being detected by the SMA controller in the dwelling.

Figure 1A:
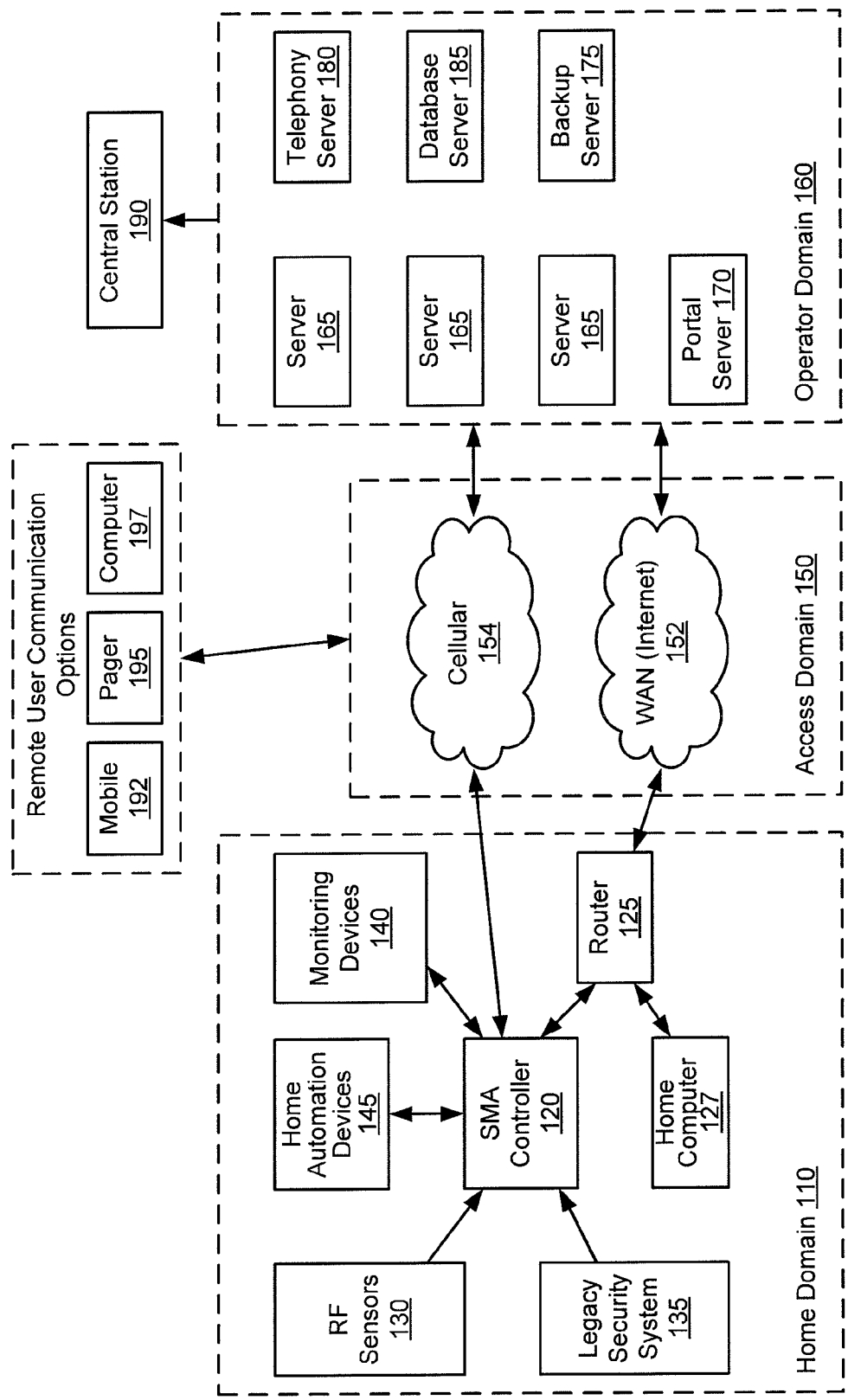
FIG. 1A is a simplified block diagram illustrating an architecture including a set of logical domains and functional entities within which embodiments of the present invention interact.

FIG. 1A is a simplified block diagram illustrating an architecture including a set of logical domains and functional entities within which embodiments of the present invention interact. A home domain 110 includes an embodiment of the SMA controller 120. The home domain is coupled via an access domain 150 to an operator domain 160 that includes various servers. The servers are in turn coupled to a central station 190 and to various remote user communication options.

The home domain refers to a collection of security, monitoring and automation entities within a dwelling or other location having SMA devices. SMA controller 120 is a device that provides an end-user SMA interface to the various SMA entities (e.g., radio-frequency sensors) within home domain 110. SMA controller 120 further acts as a gateway interface between home domain 110 and operator domain 160. SMA gateway 120 provides such gateway access to operator domain 160 via a network router 125. Network router 125 can be coupled to SMA controller 120 and to home network devices such as home computer 127 via either hard wired or wireless connections (e.g., WiFi, tethered Ethernet, and power-line network). A network router 125 coupled to a broadband modem (e.g., a cable modem or DSL modem) serves as one link to networks in access domain 150.

SMA devices within home domain 110 can include a variety of RF or wireless sensors 130 whose signals are received and interpreted by SMA gateway 120. RF sensors 130 can include, for example, door or window sensors, motion detectors, smoke detectors, glass break detectors, inertial detectors, water detectors, carbon dioxide detectors, and key fob devices. SMA gateway 120 can be configured to react to a change in state of any of these detectors. In addition to acting and reacting to changes in state of RF sensors 130, SMA controller 120 also can be coupled to a legacy security system 135. SMA controller 120 controls the legacy security system by interpreting signals from sensors coupled to the legacy security system and reacting in a user-configured manner. SMA gateway 120, for example, will provide alarm or sensor state information from legacy security system 135 to servers in operator domain 160 that may ultimately inform central station 190 to take appropriate action.

SMA gateway 120 can also be coupled to one or more monitoring devices 140. Monitoring devices 140 can include, for example, still and video cameras that provide images that are viewable on a screen of SMA gateway 120 or a remotely connected device. Monitoring devices 140 can be coupled to SMA gateway 120 either wirelessly (e.g., WiFi via router 125) or other connections.

Home automation devices 145 (e.g., home area network devices having an automation interface) can also be coupled to and controlled by SMA gateway 120. SMA gateway 120 can be configured to interact with a variety of home automation protocols, such as, for example, Z-Wave and ZigBee.

Embodiments of SMA controller 120 can be configured to communicate with a variety of RF or wireless sensors and are not limited to the RF sensors, monitoring devices and home automation devices discussed above. A person of ordinary skill in the art will appreciate that embodiments of the present invention are not limited to or by the above-discussed devices and sensors, and can be applied to other areas and devices.

Embodiments of SMA controller 120 can be used to configure and control home security devices (e.g., 130 and 135), monitoring devices 140 and automation devices 145, either directly or by providing a gateway to remote control via servers in operator domain 160. SMA controller 120 communicates with servers residing in operator domain 160 via networks in access domain 150. Broadband communication can be provided by coupling SMA controller 120 with a network router 125, which in turn is coupled to a wide area network 152, such as a provider network or the Internet, via an appropriate broadband modem. The router can be coupled to the wide area network through cable broadband, DSL, and the like. Wide area network 152, in turn, is coupled to servers in operator domain 160 via an appropriate series of routers and firewalls (not shown). SMA controller 120 can include additional mechanisms to provide a communication with the operator domain. For example, SMA controller 120 can be configured with a cellular network transceiver that permits communication with a cellular network 154. In turn, cellular network 154 can provide access via routers and firewalls to servers in operator domain 160. Embodiments of SMA controller 120 are not limited to providing gateway functionality via cellular and dwelling-based routers and modems. For example, SMA gateway 120 can be configured with other network protocol controllers such as WiMAX satellite-based broadband, direct telephone coupling, and the like.

Operator domain 160 refers to a logical collection of SMA servers and other operator systems in an operator's network that provide end-user interfaces, such as portals accessible to subscribers of the SMA service, that can configure, manage and control SMA elements within home domain 110. Servers can also provide management portals for the provider to configure available services to the SMA controllers. Servers in operator domain 160 can be maintained by a provider (operator) of subscriber-based services for SMA operations. Examples of providers include cable providers, telecommunications providers, and the like. A production server architecture in operator domain 160 can support SMA systems in millions of home domains 110.

Individual server architectures can be of a variety of types, and in one embodiment, the server architecture is a tiered Java2 Enterprise Edition (J2EE) service oriented architecture. Such a tiered service oriented architecture can include an interface tier, a service tier, and a data access logic tier. The interface tier can provide entry points from outside the server processes, including, for example, browser web applications, mobile web applications, web services, HTML, XHTML, SOAP, and the like. A service tier can provide a variety of selectable functionality passed along by the operator to the end user, including widget programs. Service tiers can relate to end user subscription levels offered by the operator (e.g., payment tiers corresponding to "gold" level service, "silver" level service and "bronze" level service). Finally the data access logic tier provides access to various sources of data including database servers.

FIG. 1A illustrates an example set of servers that can be provided in operator domain 160. Servers 165 can support all non-alarm and alarm events, heartbeat, and command traffic between the various servers and SMA controllers 120. Servers 165 can also manage end-user electronic mail and SMS notification, as well as integration with provider billing, provisioning, inventory, tech support systems, and the like.

A portal server 170 can provide various user interface applications, including, for example, a subscriber portal, a mobile portal, and a management portal. A subscriber portal is an end-user accessible application that permits an end-user to access a corresponding SMA controller remotely via standard web-based applications. Using such a subscriber portal can provide access to the same SMA functions that an interface directly coupled to the SMA controller would provide, plus additional functions such as alert and contact management, historical data, widget and camera management, account management, and the like. A mobile portal can provide all or part of the access available to an end-user via the subscriber portal. A mobile portal can be limited, however, to capabilities of an accessing mobile device (e.g., touch screen or non-touch screen cellular phones). A management portal provides an operator representative access to support and manage SMA controllers in home domains 110 and corresponding user accounts via a web-based application. Using a management portal, an operator representative can provision and provide a variety of functionality via, for example, widget programs to the SMA controllers, as will be discussed in greater detail below. The management portal can provide tiers of management support so that levels of access to user information can be restricted based on authorization of a particular employee.

Telephony server 180 can process and send information related to alarm events received from SMA controllers 120 to alarm receivers at central monitoring station 190. A server 165 that processes the alarm event makes a request to telephony server 180 to dial the central station's receiver and send corresponding contact information. Telephony server 180 can communicate with a plurality of central stations 190. Server 165 can determine a correct central station to contact based upon user account settings associated with the transmitting SMA controller. Thus, alarms can be routed to different central stations based upon user accounts. Further, accounts can be transferred from one central station to another by modifying user account information. Telephony server 180 can communicate with alarm receivers at central station 190 using, for example, a security industry standard contact identification protocol (e.g., dual-tone multi-frequency [DTMF]) and broadband protocols.

A backup server 175 can be provided to guarantee that an alarm path is available in an event that one or more servers 165 become unavailable or inaccessible. A backup server 175 can be co-located to the physical location of servers 165 to address scenarios in which one or more of the servers fail. Alternatively, a backup server 175 can be placed in a location remote from servers 165 in order to address situations in which a network failure or a power failure causes one or more of servers 165 to become unavailable. SMA controllers 120 can be configured to transmit alarm events to a backup server 175 if the SMA controller cannot successfully send such events to servers 165.

A database server 185 provides storage of all configuration and user information accessible to other servers within operator domain 160. Selection of a type of database provided by database server 185 can be dependent upon a variety of criteria, including, for example, scalability and availability of data. One embodiment of the present invention uses database services provided by an ORACLE database.

Figure 1B:
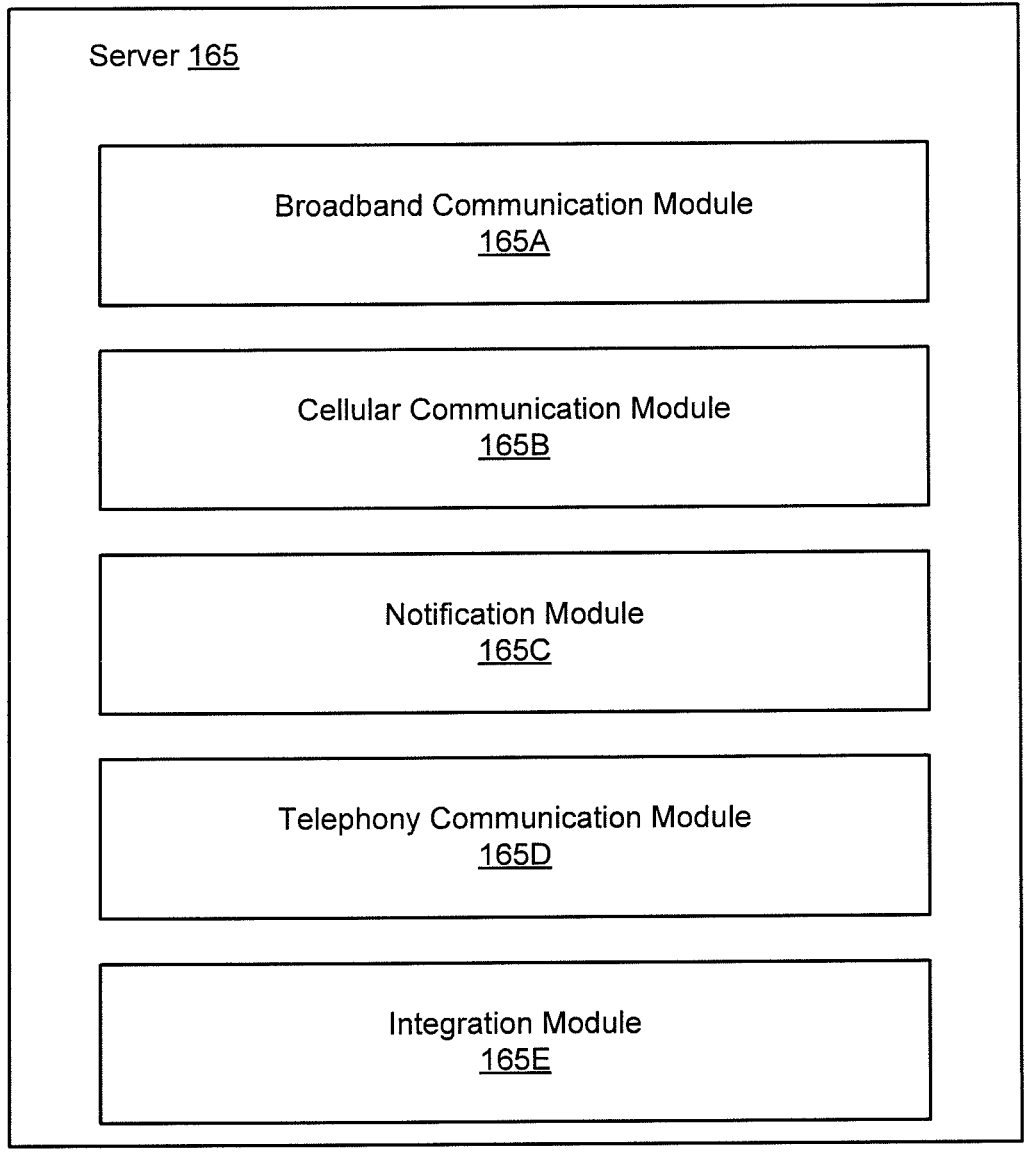
FIG. 1B is a simplified block diagram illustrating a logical architecture for a server 165, usable by embodiments of the present invention.

FIG. 1B is a simplified block diagram illustrating a logical architecture for a server 165, usable by embodiments of the present invention. A server 165 in operator domain 160 provides a variety of functionality. Logically, a server 165 can be divided into the following functional modules: a broadband communication module 165A, a cellular communication module 165B, a notification module 165C, a telephony communication module 165D, and an integration module 165E.

Broadband communication module 165A manages broadband connections and message traffic from a plurality of SMA controllers 110 coupled to server 165. Embodiments of the present invention provide for the broadband channel to be a primary communication channel between an SMA controller 120 and servers 165. The broadband communication module handles a variety of communication, including, for example, all non-alarm and alarm events, broadband heartbeat, and command of traffic between server 165 and SMA controller 120 over the broadband channel. Embodiments of the present invention provide for an always-on persistent TCP socket connection to be maintained between each SMA controller and server 165. A variety of protocols can be used for communications between server 165 and SMA controller 120

(e.g., XML over TCP, and the like). Such communication can be secured using standard transport layer security (TLS) technologies. Through the use of an always-on socket connection, servers 165 can provide near real-time communication between the server and an SMA controller 120. For example, if a user has a subscriber portal active and a zone is tripped within home domain 110, a zone fault will be reflected in near real-time on the subscriber portal user interface.

Cellular communication module 165B manages cellular connections and message traffic from SMA controllers 120 to a server 165. Embodiments of the present invention use the cellular channel as a backup communication channel to the broadband channel. Thus, if a broadband channel becomes unavailable, communication between an SMA controller and a server switches to the cellular channel. At this time, the cellular communication module on the server handles all non-alarm and alarm events, and command traffic from an SMA controller. When a broadband channel is active, heartbeat messages can be sent periodically on the cellular channel in order to monitor the cellular channel. When a cellular protocol communication stack is being used, a TCP socket connection can be established between the SMA controller and server to ensure reliable message delivery for critical messages (e.g., alarm events and commands). Once critical messages have been exchanged, the TCP connection can be shut down thereby reducing cellular communication costs. As with broadband communication, XMPP can be the messaging protocol used for such communications. Similarly, such communication can be secured using TLS and SASL authentication protocols. Non-critical messages between an SMA controller and a server can be sent using UDP. A compressed binary protocol can be used as a messaging protocol for such communications in order to minimize cellular costs for such message traffic. Such messages can be secured using an encryption algorithm, such as the tiny encryption algorithm (TEA). Cellular communication can be established over two network segments: the GSM service provider's network that provides a path between an SMA controller and a cellular access point, and a VPN tunnel between the access point and an operator domain data center.

A notification module 165C determines if and how a user should be notified of events generated by their corresponding SMA controller 120. A user can specify who to notify of particular events or event types and how to notify the user (e.g., telephone call, electronic mail, text message, page, and the like), and this information is stored by a database server 185. When events such as alarm or non-alarm events are received by a server 165, those events can be passed asynchronously to the notification module, which determines if, who and how to send those notifications based upon the user's configuration.

As discussed above, the network connection between an SMA controller 120 and a server 165 is always on and persistent. This allows for constant remote monitoring of the state of the SMA controller, sensors, and devices coupled to the SMA controller. Notification module 165C can be configured to report state changes of the SMA controller and sensors to previously determined entities. Such state change information can also include a current communication mode between the SMA controller and server. For example, if broadband communication becomes unavailable and a switch is made to cellular communication, an end user can be automatically notified of the change. Likewise, if all communication with the SMA controller is lost, then a different notification can be provided. The nature of a notification associated with an event can be configured by an end user or provider through portal server 170 or an input device coupled to SMA controller 120.

Connectivity reporting can also be used to report a loss of communication subsequent to a zone fault event and to define a response to such a scenario. An SMA controller can be configured with an entry delay timer that allows a person entering home domain 110, and thereby triggering a zone fault event, to disarm an armed SMA controller before an alarm signal is sent to a central station 190. An intruder to the home domain might take advantage of the unified nature of the SMA controller and disable the SMA controller prior to expiration of the entry delay (i.e., a so-called "smash-and-grab" scenario), in order to prevent sounding of an alarm. The continuous communication between the SMA controller and an operator domain server results in the sensor state change associated with the zone fault event to be provided to a server 165 in near real time, along with a message indicating that the SMA controller's entry delay timer has been initiated. If the server subsequently detects a loss of communication with the SMA controller before a disarm signal is received, the notification module can be configured to relay an alarm signal to, for example, one or more of the end user, the central station, and a provider administrator. The alarm signal can be defined using available central station protocols (e.g., contact ID) to indicate a "smash and grab" scenario or an indication that is agreed upon between the central station provider and the provider of the operator domain services.

The server can further be configured with a delay window that results in the server waiting to report an alarm associated with the zone fault event. This allows for communication to be restored with the SMA controller and a disarm signal to be received prior to transmission of the alarm report. A configurable server delay window can be defined in accord with security industry best practices, such as those defined in ANSI/SIA CP-01-20xx (Revision of ANSI/SIA CP-01-2007) "Control Panel Standard—Features for False Alarm Reduction" (e.g., a combination of one or more of the standard's entry delay, abort window and cancel window). Alternatively, the configurable server delay window can be defined in accord with a provider's specifications (e.g., customer tiers or purchased services). The delay window timer can be started at the same time the message indicating that the SMA controller's entry delay timer has been initiated is received. Alternatively, the server can start the delay window timer at the same time the loss of communication is detected. As a further alternative, the server can independently track the entry delay timer when the message indicating that the SMA controller's entry delay timer has been initiated and then start the delay window time subsequent to the expiration of the entry delay timer. In general, a delay window timer tracked by the server can include an aggregation of the entry delay timer, as configured at the SMA controller, and an additional time configured by the provider (e.g., a "smash and grab" wait time). This general delay window timer can be started at the time the message indicating that the SMA controller's entry delay timer has been initiated is received (or alternatively, upon receipt of the zone fault event message while the system state is armed).

Figure 2:
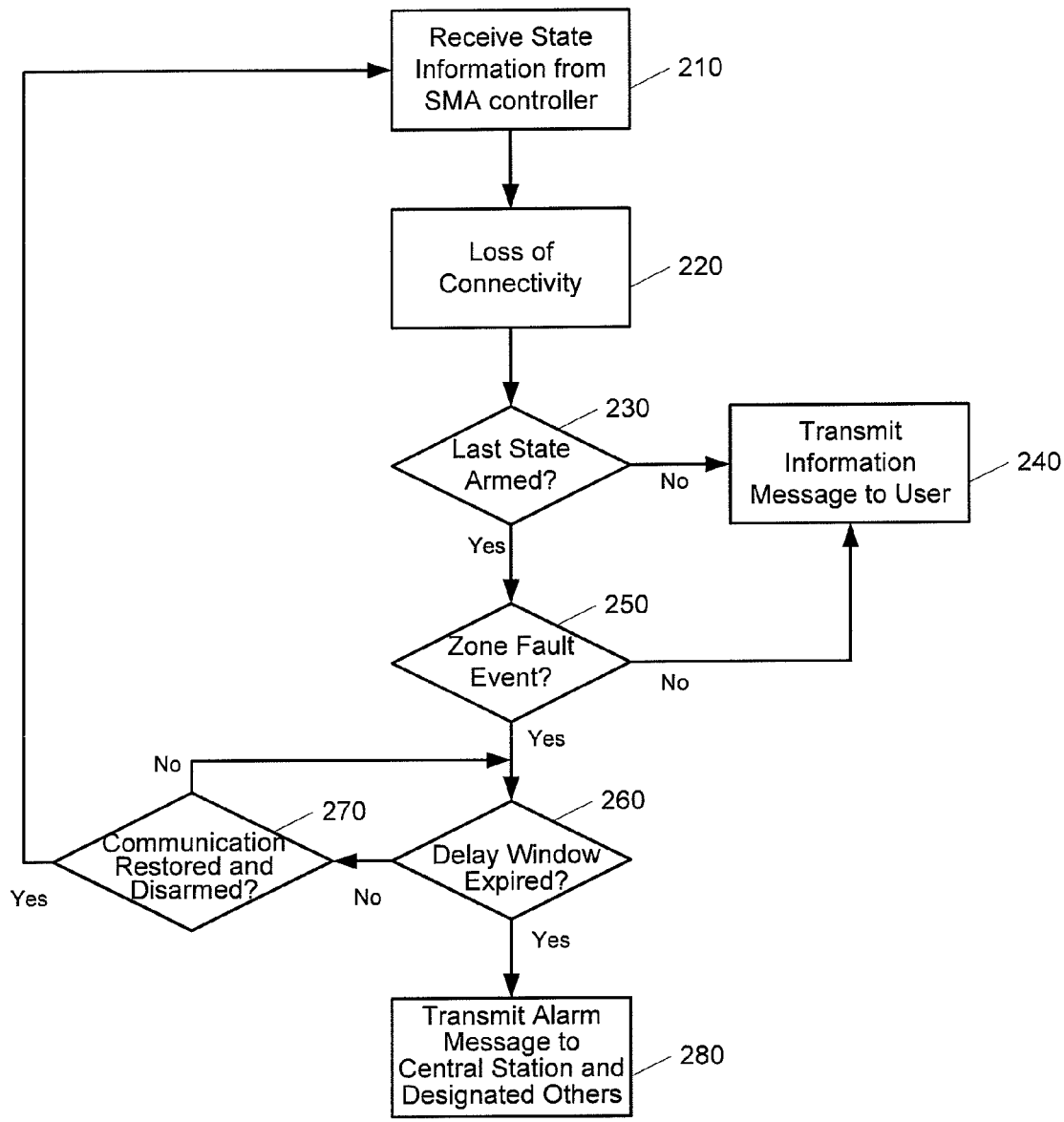
FIG. 2 is a simplified flow diagram illustrating reporting of loss of connectivity and possible transmission of an alarm event, in accord with embodiments of the present invention.

FIG. 2 is a simplified flow diagram illustrating reporting of loss of connectivity and possible transmission of an alarm associated with a zone fault event, in accord with embodiments of the present invention. As discussed above, state information related to the SMA controller is received by a server 165 using, for example, a persistent network connection through a broadband communication module 165A (210). Such state information can include, for example, an indication of continued operation of the SMA controller, arm/disarm, and sensor event state changes (e.g., a zone fault event).

The server then detects a loss of connectivity or communication with the SMA controller (220). If the server determines that the SMA controller was not armed (230), then a notification of the loss of communication is transmitted by notification module 165C to preconfigured recipients (e.g., the end users) (240). If the server determines that the SMA controller was armed at the time of loss of communication (230), a determination can be made as to whether a sensor zone fault event had been detected prior to the loss of communication (250). If no sensor event had been detected, then a notification of loss of communication can be transmitted to the preconfigured recipients (240). If a sensor event had been detected prior to the loss of communication, and the system was armed, then a determination is made as to whether the preconfigured server delay window has expired (260). The delay window is tracked solely by the server, but can include an aggregation of the entry delay configured by the SMA controller as well as an additional time configured by the provider (e.g., the "smash and grab" wait time). The delay window timer can begin at the time a message is received by the server that an entry delay timer has been initiated or at the time the loss of connectivity is detected.

If the delay window has not expired, then a determination is made as to whether communication is restored and the SMA controller is disarmed (270). If communications are restored and the SMA controller is disarmed, then the process can return to a monitoring state (210). If communications are not restored and the SMA controller disarmed, then communications are monitored until the expiration of the delay window. Once the delay window expires without further communication with the SMA controller, an alarm event message is transmitted to a central station 190 and to other preconfigured recipients (280). As discussed above, the alarm event message can be designated as a "smash and grab" alarm event or a general alarm event, as agreed to between the central station provider and the provider of SMA services.

As indicated above, the server-based delay window is configurable by the provider of the SMA services. In one embodiment, the server-based delay window can represent an aggregate of the user-configurable entry delay on the SMA controller and a provider-configurable "smash and grab" delay time (e.g., entry delay of 30 seconds and a "smash and grab" delay time of 60 seconds results in a total delay window of 90 seconds before sending the alarm message to the central station). In another embodiment, an SMA controller can be configured to send an alarm indication message to the remote server, but then the server will wait the delay window time to receive a second alarm message or a cancel message from the SMA controller before sending the alarm message to the central station. In this embodiment, the server can wait for the delay window to expire before sending the alarm if the server hasn't received the second message from the SMA controller. If a second alarm message is received, then an alarm message will be sent to the central station immediately, without waiting for expiration of the delay window. In this scenario, the delay window is the provider-configured "smash and grab" time or an "abort window" per ANSI/SIA CP-01 or the like. In either scenario, the server-based delay time (e.g., the "smash and grab" delay time) can be based upon user tiers (i.e., higher paying customers getting shorter delay times) or other criteria of the provider's choosing.

In addition, FIG. 2 illustrates a determination that a loss of connectivity has occurred. In an alternative embodiment, no such determination need be made. Instead, if SMA controller 120 fails to provide a disarm or some other communication to server 165 within the delay window period, then the alarm message is provided to the central station.

Telephony communication module 165D provides communication between a server 165 and telephony server 180. When a server 165 receives and performs initial processing of alarm events, the telephony communication module forwards those events to a telephony server 180 which in turn communicates with a central station 190, as discussed above.

Integration module 165E provides infrastructure and interfaces to integrate a server 165 with operator business systems, such as, for example, billing, provisioning, inventory, tech support, and the like. An integration module can provide a web services interface for upstream integration that operator business systems can call to perform operations like creating and updating accounts and querying information stored in a database served by database server 185. An integration module can also provide an event-driven framework for downstream integration to inform operator business systems of events within the SMA system.

SMA Controller Architecture

Figure 3A:
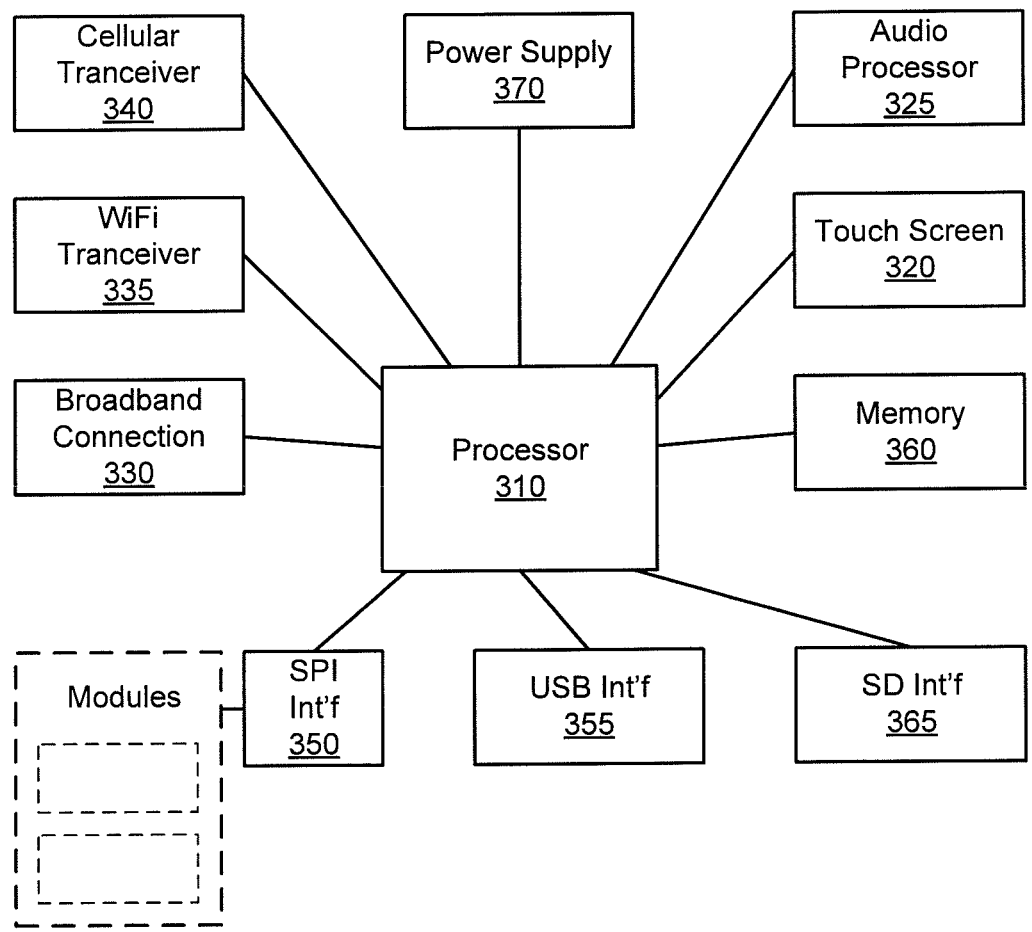
FIG. 3A is a simplified block diagram illustrating a hardware architecture of an SMA controller, according to one embodiment of the present invention.

FIG. 3A is a simplified block diagram illustrating a hardware architecture of an SMA controller, according to one embodiment of the present invention. A processor 310 is coupled to a plurality of communications transceivers, interface modules, memory modules, and user interface modules. Processor 310, executing firmware discussed below, performs various tasks related to interpretation of alarm and non-alarm signals received by SMA controller 120, interpreting reactions to those signals in light of configuration information either received from a server (e.g., server 165) or entered into an interface provided by SMA controller 120 (e.g., a touch screen 320). Embodiments of the present invention can use a variety of processors, for example, an ARM core processor such as a FREESCALE i.MX35 multimedia applications processor.

SMA controller 120 can provide for user input and display via a touch screen 320 coupled to processor 310. Processor 310 can also provide audio feedback to a user via use of an audio processor 325. Audio processor 325 can, in turn, be coupled to a speaker that provides sound in home domain 110. SMA controller 120 can be configured to provide a variety of sounds for different events detected by sensors associated with the SMA controller. Such sounds can be configured by a user so as to distinguish between alarm and non-alarm events.

As discussed above, an SMA controller 120 can communicate with a server 165 using different network access means. Processor 310 can provide broadband access to a router (e.g., router 125) via an Ethernet broadband connection PHY 130 or via a WiFi transceiver 335. The router can then be coupled to or be incorporated within an appropriate broadband modem. Cellular network connectivity can be provided by a cellular transceiver 340 that is coupled to processor 310. SMA controller 120 can be configured with a set of rules that govern when processor 310 will switch between a broadband connection and a cellular connection to operator domain 160.

In order to communicate with the various sensors and devices within home domain 110, processor 310 can be coupled to one or more transceiver modules via, for example, a serial peripheral interface such as a SPI bus 350. Such transceiver modules permit communication with sensors of a variety of protocols in a configurable manner. Embodiments of the present invention can use a transceiver to communicate with a variety of RF sensors 130, using a variety of communication protocols. Similarly, home automation transceivers (e.g., home area network devices having an automation interface) that communicate using, for example, Z-Wave or Zig- Bee protocols can be coupled to processor 310 via SPI 350. If SMA controller 120 is coupled to a legacy security system 135, then a module permitting coupling to the legacy security system can be coupled to processor 310 via SPI 350. Other protocols can be provided for via such plug-in modules including, for example, digital enhanced cordless telecommunication devices (DECT). In this manner, an SMA controller 120 can be configured to provide for control of a variety of devices and protocols known both today and in the future. In addition, processor 310 can be coupled to other types of devices (e.g., transceivers or computers) via a universal serial bus (USB) interface 355.

In order to locally store configuration information and software (e.g., widget programs) for SMA controller 120, a memory 360 is coupled to processor 310. Additional memory can be coupled to processor 310 via, for example, a secure digital interface 365. A power supply 370 is also coupled to processor 310 and to other devices within SMA controller 120 via, for example, a power management controller module.

SMA controller 120 is configured to be a customer premises equipment device that works in conjunction with server counterparts in operator domain 160 in order to perform functions required for security monitoring and automation. Embodiments of SMA controller 120 provide a touch screen interface (e.g., 320) into all the SMA features. Via the various modules coupled to processor 310, the SMA controller bridges the sensor network, the control network, and security panel network to broadband and cellular networks. SMA controller 120 further uses the protocols discussed above to carry the alarm and activity events to servers in the operator domain for processing. These connections also carry configuration information, provisioning commands, management and reporting information, security authentication, any real-time media such as video or audio, and any data transfer required by locally-executing widget programs.

Figure 3B:
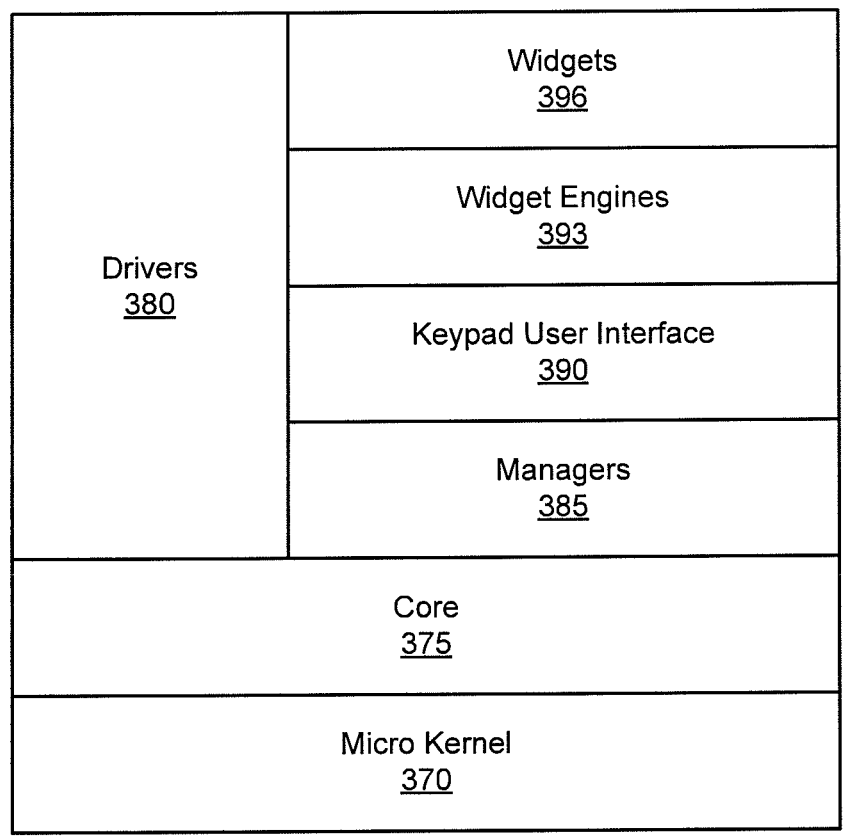
FIG. 3B is a simplified block diagram illustrating a logical stacking of an SMA controller's firmware architecture, usable with embodiments of the present invention.

FIG. 3B is a simplified block diagram illustrating a logical stacking of an SMA controller's firmware architecture, usable with embodiments of the present invention. Since SMA controller 120 provides security functionality for home domain 110, the SMA controller should be a highly available system. High availability suggests that the SMA controller be ready to serve an end-user at all times, both when a user is interacting with the SMA controller through a user interface and when alarms and other non-critical system events occur, regardless of whether a system component has failed. In order to provide such high availability, SMA controller 120 runs a micro-kernel operating system 370. An example of a micro-kernel operating system usable by embodiments of the present invention is a QNX real-time operating system. Under such a micro-kernel operating system, drivers, applications, protocol stacks and file systems run outside the operating system kernel in memory-protected user space. Such a micro-kernel operating system can provide fault resilience through features such as critical process monitoring and adaptive partitioning. As a result, components can fail, including low-level drivers, and automatically restart without affecting other components or the kernel and without requiring a reboot of the system. A critical process monitoring feature can automatically restart failed components because those components function in the user space. An adaptive partitioning feature of the micro kernel operating system provides guarantees of CPU resources for designated components, thereby preventing a component from consuming all CPU resources to the detriment of other system components.

A core layer 375 of the firmware architecture provides service/event library and client API library components. A client API library can register managers and drivers to handle events and to tell other managers or drivers to perform some action. The service/event library maintains lists of listeners for events that each manager or driver detects and distributes according to one of the lists.

Driver layer 380 interacts with hardware peripherals of SMA controller 120. For example, drivers can be provided for touch screen 320, broadband connection 330, WiFi transceiver 335, cellular transceiver 340, USB interface 355, SD interface 365, audio processor 325, and the various modules coupled to processor 310 via SPI interface 350. Manager layer 385 provides business and control logic used by the other layers. Managers can be provided for alarm activities, security protocols, keypad functionality, communications functionality, audio functionality, and the like.

Keypad user interface layer 390 drives the touch screen user interface of SMA controller 120. An example of the touch screen user interface consists of a header and a footer, widget icons and underlying widget user interfaces. Keypad user interface layer 390 drives these user interface elements by providing, for example, management of what the system Arm/Disarm interface button says and battery charge information, widget icon placement in the user face area between the header and footer, and interacting with widget engine layer 393 to display underlying widget user interface when a widget icon is selected.

In embodiments of the present invention, typical SMA controller functions are represented in the touch screen user interface as widgets (or active icons). Widgets provide access to the various security monitoring and automation control functions of SMA controller 120 as well as support for multimedia functionality through widgets that provide, for example, news, sports, weather and digital picture frame functionality. A main user interface screen can provide a set of icons, each of which represents a widget. Selection of a widget icon can then launch the widget. Widget engine layer 393 includes, for example, widget engines for native, HTML and FLASH-based widgets. Widget engines are responsible for displaying particular widgets on the screen. For example, if a widget is developed in HTML, selection of such a widget will cause the HTML widget engine to display the selected widget or touch screen 320. Information related to the various widgets is provided in widget layer 396.

Figure 4:
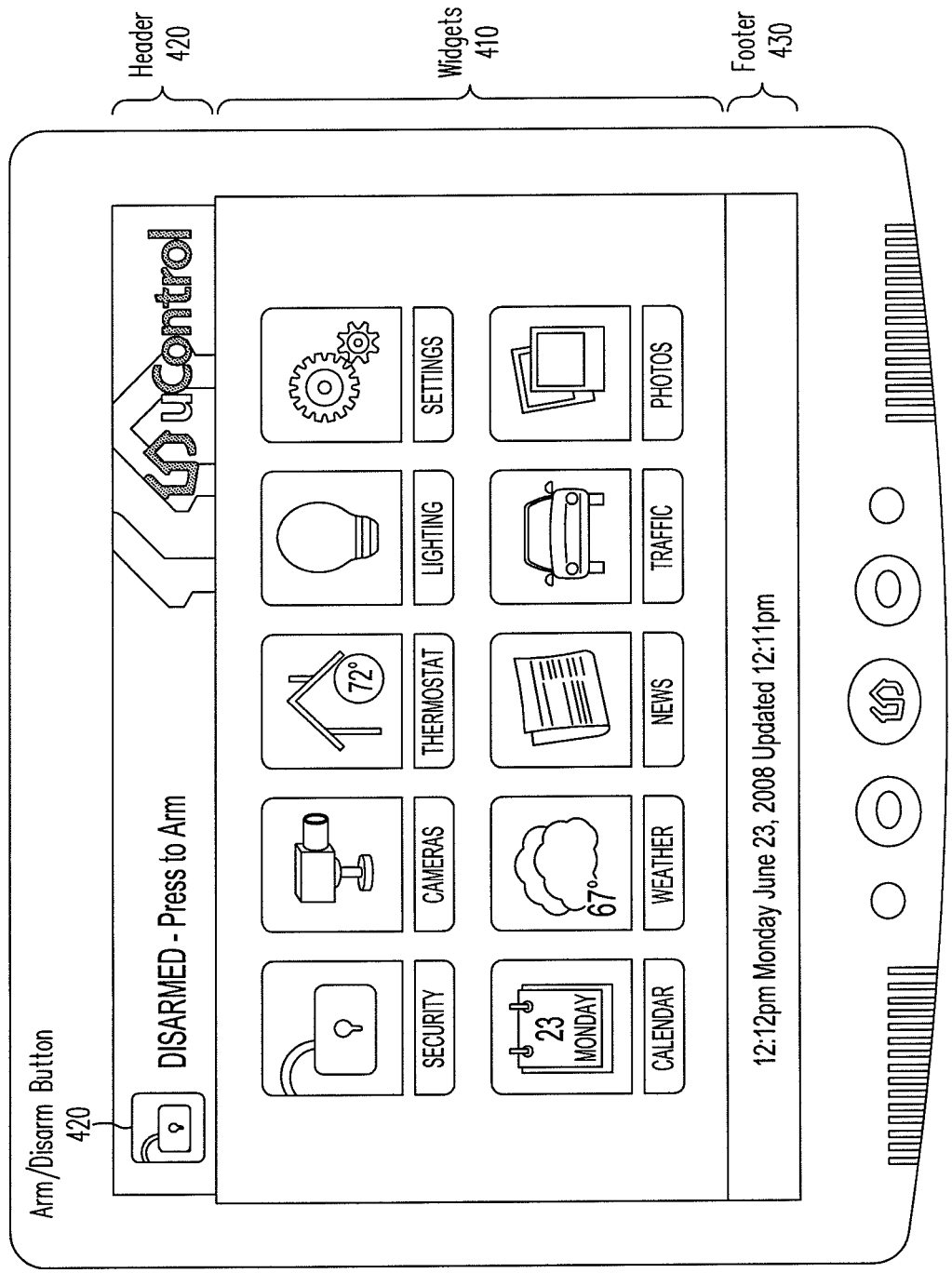
FIG. 4 is an illustration of an example user interface for an SMA controller 120, according to an embodiment of the present invention.

FIG. 4 is an illustration of an example user interface for an SMA controller 120, according to an embodiment of the present invention. The illustrated user interface provides a set of widget icons 410 that provide access to functionality of SMA controller 120. As illustrated, widgets are provided to access security functionality, camera images, thermostat control, lighting control, and other settings of the SMA controller. Additional widgets are provided to access network-based information such as weather, news, traffic, and digital picture frame functionality. A header 420 provides access to an Arm/Disarm button 425 that allows for arming the security system or disarming it. Additional information can be provided in the header, such as, for example, network status messages. A footer 430 can provide additional status information such as time and date, as displayed.

A user can select widgets corresponding to desired functionality. Embodiments of the present invention provide for access to widgets via portal server 170. A provider of operator domain 160 can determine functionality accessible to users, either for all users or based upon tiers of users (e.g., subscription levels associated with payment levels). A user can then select from the set of accessible widgets and the selected widgets will be distributed and displayed on the user interface of SMA controller 120. Configurability of SMA controller 120 is also driven by user determined actions and reactions to sensor stimulus.

An Example Computing and Network Environment

As shown above, the present invention can be implemented using a variety of computer systems and networks. An example of one such computing and network environment is described below with reference to FIGS. 5 and 6.

Figure 5:
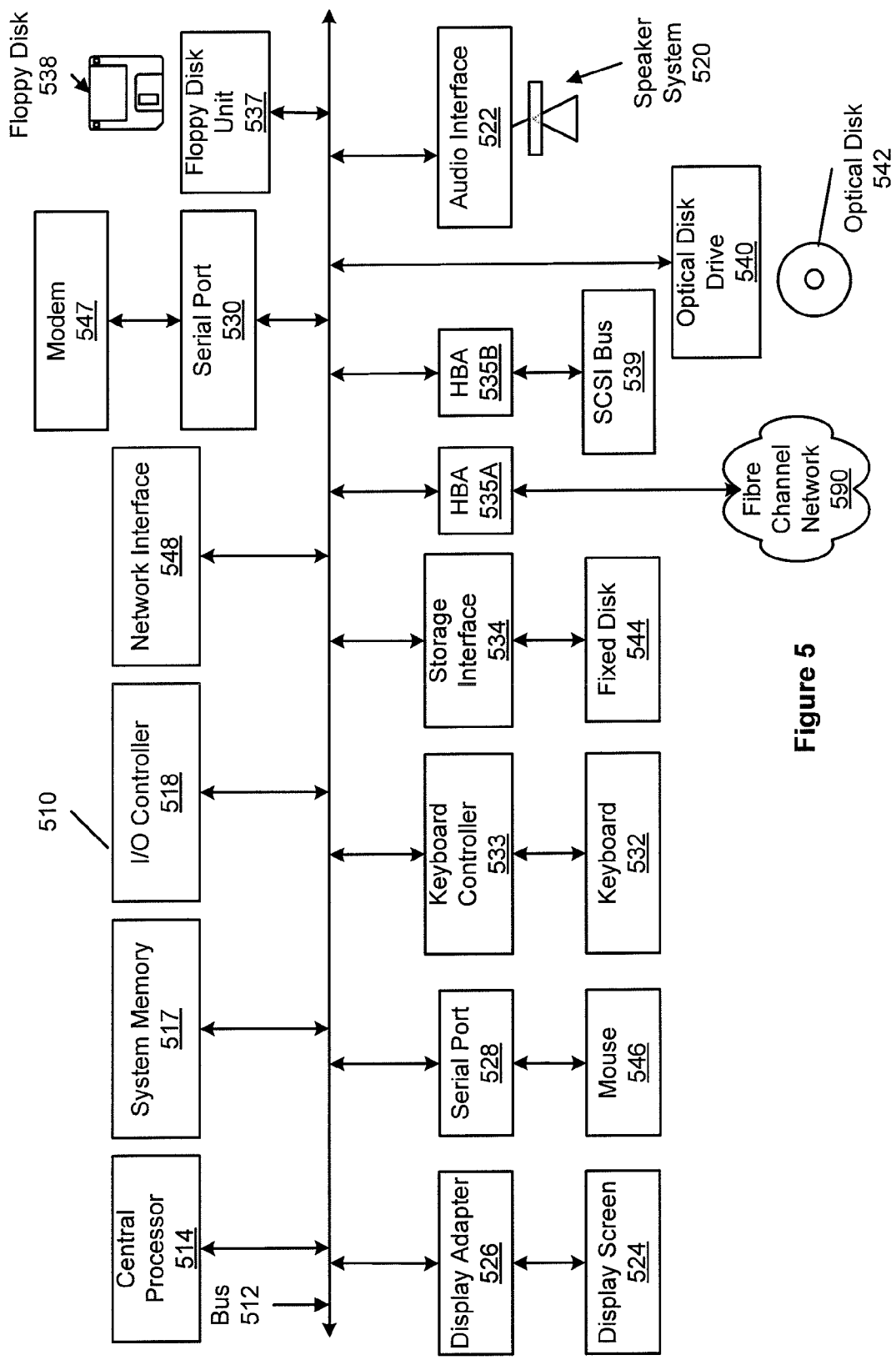
FIG. 5 depicts a block diagram of a computer system suitable for implementing aspects of the present invention.

FIG. 5 depicts a block diagram of a computer system 510 suitable for implementing aspects of the present invention (e.g., servers 165, portal server 170, backup server 175, telephony server 180, and database server 185). Computer system 510 includes a bus 512 which interconnects major subsystems of computer system 510, such as a central processor 514, a system memory 517 (typically RAM, but which may also include ROM, FLASH RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or FLASH memory (neither shown), and random access memory (RAM) (not shown), as previously noted. The RAM is generally the main memory into which the operating system and application programs are loaded. The ROM or FLASH memory can contain, among other code, the Basic Input-Output system (BIOS) which controls basic hardware operation such as the interaction with peripheral components. Applications resident with computer system 510 are generally stored on and accessed via a computer-readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer-readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an interne service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
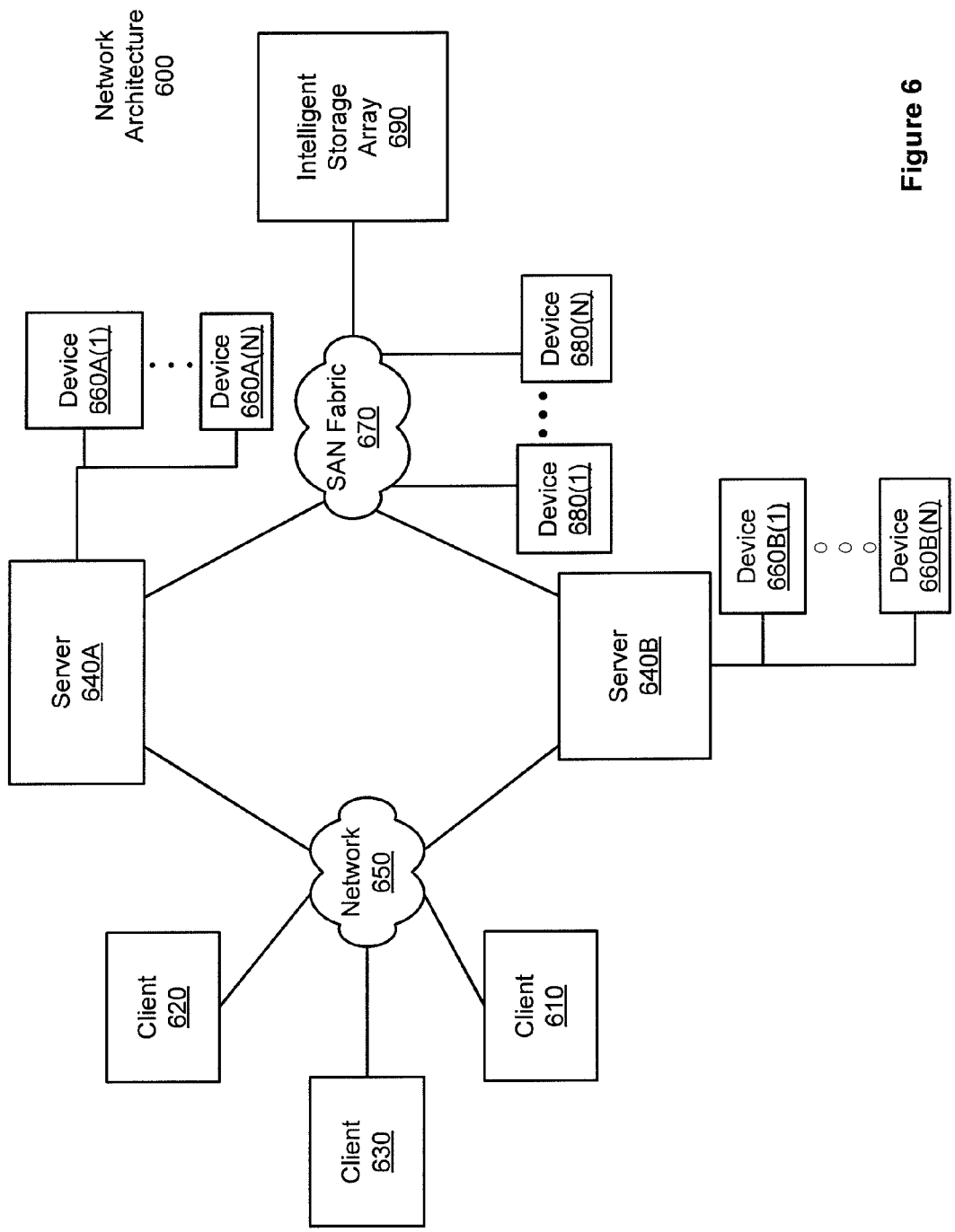
FIG. 6 is a block diagram depicting a network architecture suitable for implementing aspects of the present invention.
Figure 7:
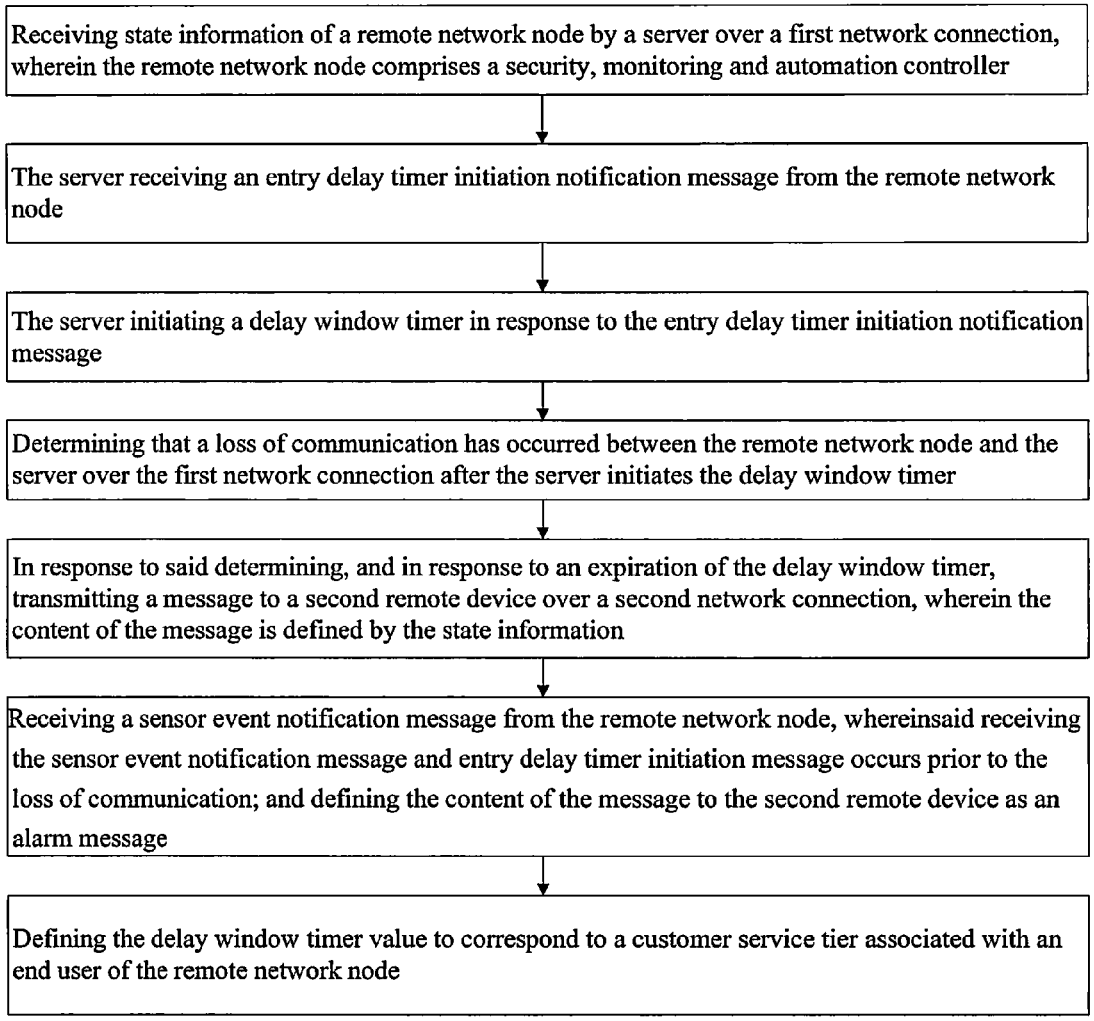
FIGS. 7 and 8 are respective flow charts illustrating example methods implemented by a server within the operator domain of FIG. 1A.
Figure 8:
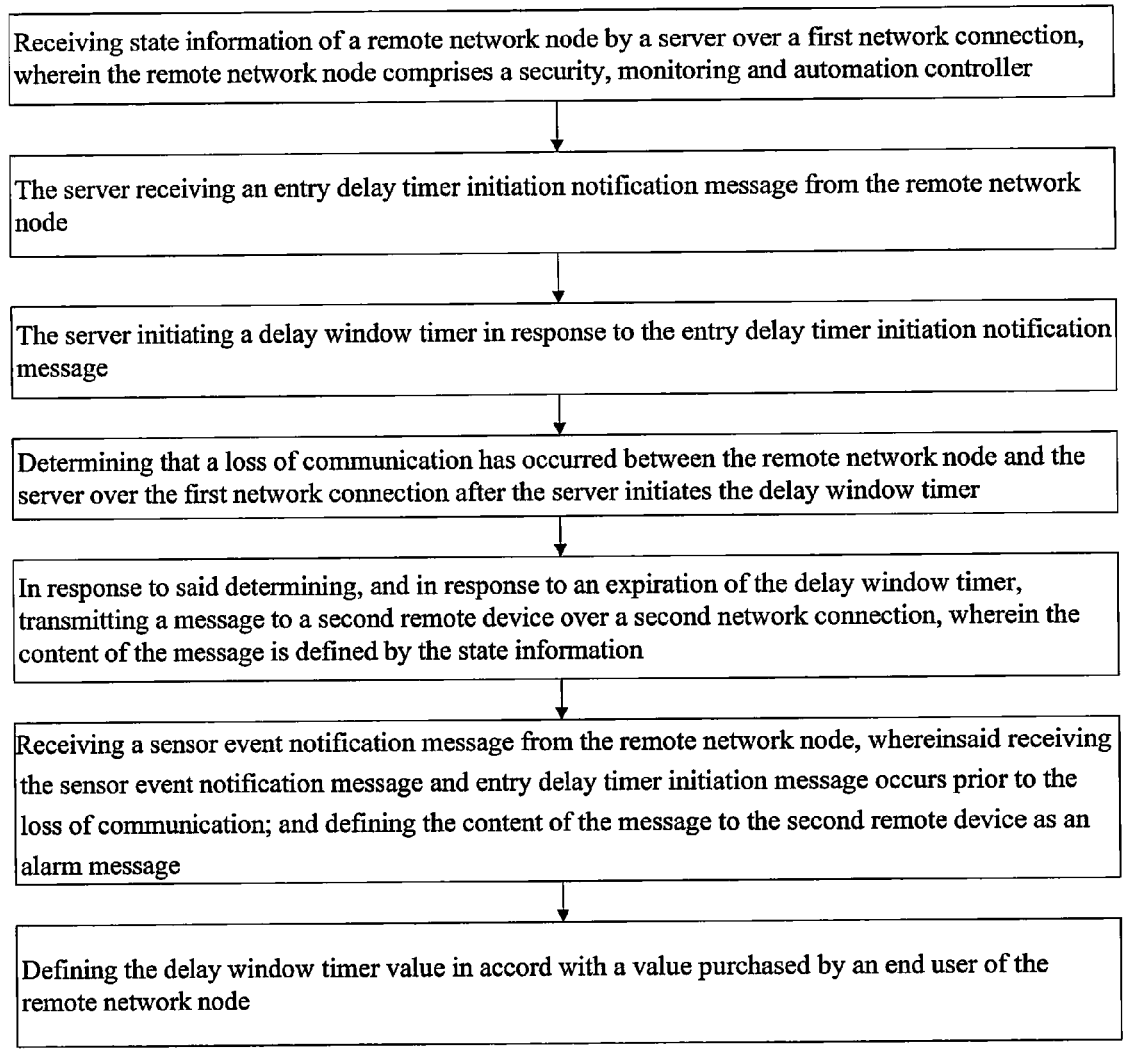

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and FLASH-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
    receiving state information of a remote network node by a server over a first network connection;
    the server receiving an entry delay timer initiation notification message from the remote network node;
    the server initiating a delay window timer in response to the entry delay timer initiation notification message;
    determining that a loss of communication has occurred between the remote network node and the server over the first network connection after the server initiates the delay window timer;
    in response to the determining and in response to an expiration of the delay window timer, transmitting a message to a second remote device over a second network connection, wherein the content of the message is defined by the state information.

2. The method of claim 1, wherein the remote network node is a security, monitoring and automation controller.

3. The method of claim 2, comprising:
    receiving a sensor event notification message from the remote network node, wherein the receiving the sensor event notification message and entry delay timer initiation message occurs prior to the loss of communication; and
    defining the content of the message to the second remote device as an alarm message.

4. The method of claim 3, wherein the second remote device comprises an alarm monitoring central station.

5. The method of claim 3, comprising defining the delay window timer value to correspond to a customer service tier associated with an end user of the remote network node.

6. The method of claim 3, comprising defining the delay window timer value in accord with a value purchased by an end user of the remote network node.

7. The method of claim 3, wherein the second remote device comprises one or more of a portal server, a mobile network device, and a remote user's computer.

8. The method of claim 2, comprising defining the content of the message as an information message, wherein the information comprises one or more of the received state information of the remote network device and the status of the first network connection.

9. An apparatus comprising:
    a first communication interface coupled to a first network connection, wherein the first communication interface is configured to receive state information of a remote network node over the first network connection and an entry delay timer initiation notification message from the remote network node;
    a second communication interface coupled to a second network connection, wherein the second communication interface is configured to communicate with a second remote device over the second network connection;
    a processor coupled to the first and second communication interfaces, the processor configured to initiate a delay window timer in response to the apparatus receiving the entry delay timer initiation notification message, determine that a loss of communication has occurred between the remote network node and the apparatus after the apparatus receives the entry delay timer initiation notification message, and, in response to the determining and in response to an expiration of the delay window timer, generate a message comprising data defined by the state information, and transmit the message to the second remote device using the second communication interface.

10. The apparatus of claim 9, wherein the remote network node is a security, monitoring and automation controller.

11. The apparatus of claim 10, comprising the first communication interface receiving a sensor event notification message, wherein the sensor event notification message and the entry delay timer initiation message are received prior to the loss of communication, wherein the processor defines the content of the message as an alarm message.

12. The apparatus of claim 11, wherein the second remote device comprises an alarm monitoring central station.

13. The apparatus of claim 11, comprising the processor using the delay window timer value defined to correspond to a customer service tier associated with an end user of the remote network node.

14. The apparatus of claim 11, comprising the processor using the delay window timer value defined in accord with a value purchased by an end user of the remote network node.

15. The apparatus of claim 11, wherein the second remote device comprises one or more of a portal server, a mobile network device, and a remote user's computer.

16. The apparatus of claim 10, comprising the processor defining the content of the message as an information message, wherein the information comprises one or more of the received state information of the remote network device and the status of the first network connection.

17. A system comprising:
a remote network node coupled to a server by a first network connection, wherein the remote network node transmits state information and an entry delay timer initiation notification message to the server using the first network connection;
a second remote device coupled to the server by a second network connection;
the server determining that a loss of communication has occurred between the remote network node and the server over the first network connection, initiating a delay window timer in response to the server receiving the entry delay timer initiation notification message, and, in response to the determining and in response to an expiration of the delay window timer, generating a message comprising content defined by the state information, and transmitting the message to the second remote device.

18. The system of claims 17, wherein the remote network node comprises a security, monitoring and automation controller, wherein the remote network node transmits a sensor event notification message, wherein the server defines the content of the message as an alarm message.

19. The system of claim 18, wherein the second remote device comprises an alarm monitoring central station.

20. The system of claim 18, wherein the processor defines the content of the message as an information message, wherein the information comprises one or more of the received state information of the remote network device and the status of the first network connection.

* * * * *